United States Patent
Jourdan et al.

(10) Patent No.: US 7,243,219 B2
(45) Date of Patent: Jul. 10, 2007

(54) PREDICTING INSTRUCTION BRANCHES WITH A PLURALITY OF GLOBAL PREDICTORS USING VARYING AMOUNTS OF HISTORY INSTRUCTION

(75) Inventors: Stephan J. Jourdan, Portland, OR (US); Mark C. Davis, Portland, OR (US); Pierre Michaud, Bruz (FR)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 10/743,711

(22) Filed: Dec. 24, 2003

(65) Prior Publication Data
US 2005/0149707 A1 Jul. 7, 2005

(51) Int. Cl.
*G06F 7/38* (2006.01)
*G06F 9/00* (2006.01)
*G06F 15/00* (2006.01)
*G06F 9/44* (2006.01)

(52) U.S. Cl. ..................... 712/239; 712/239
(58) Field of Classification Search ............. 712/239
See application file for complete search history.

(56) References Cited

U.S. PATENT DOCUMENTS

| | | | | |
|---|---|---|---|---|
| 5,758,142 A | * | 5/1998 | McFarling et al. | 712/239 |
| 6,374,349 B1 | * | 4/2002 | McFarling | 712/239 |
| 6,976,157 B1 | * | 12/2005 | Sinharoy | 712/239 |
| 2001/0047467 A1 | * | 11/2001 | Yeh et al. | 712/228 |
| 2004/0210749 A1 | * | 10/2004 | Biles | 712/240 |
| 2004/0225872 A1 | * | 11/2004 | Bonanno et al. | 712/239 |

* cited by examiner

*Primary Examiner*—Eddie Chan
*Assistant Examiner*—Brian P Johnson
(74) *Attorney, Agent, or Firm*—Kenyon & Kenyon LLP

(57) ABSTRACT

Systems and methods of processing branch instructions provide for a bimodal predictor and a plurality of global predictors. The bimodal predictor is coupled to a prediction selector, where the bimodal predictor generates a bimodal prediction for branch instructions. The plurality of global predictors is coupled to the prediction selector, where each global predictor generates a corresponding global prediction for a branch instruction using different history or stew lengths. The prediction selector selects branch predictions from the bimodal prediction and the global predictions in order to arbitrate between predictors. The arbitration, update, and allocation schemes are designed to choose the most accurate predictor for each branch. Lower level predictors are used as filters to increase effective predictor capacity. Allocate and update schemes minimize aliasing between predictors. Branch predictors incorporating a plurality of global predictors in this fashion are more adaptive than conventional predictors with fixed branch history lengths and are able to achieve superior accuracy.

25 Claims, 5 Drawing Sheets

PREDICTING INSTRUCTION BRANCHES WITH A PLURALITY OF GLOBAL PREDICTORS USING VARYING AMOUNTS OF HISTORY INSTRUCTION

BACKGROUND

1. Technical Field

Embodiments of the present invention generally relate to computers. More particularly, embodiments relate to branch prediction in computer processing architectures.

2. Discussion

In the computer industry, the demand for higher processing speeds is well documented. While such a trend is highly desirable to consumers, it presents a number of challenges to industry participants. A particular area of concern is branch prediction.

Modern day computer processors are organized into one or more "pipelines," where a pipeline is a sequence of functional units (or "stages") that processes instructions in several steps. Each functional unit takes inputs and produces outputs, which are stored in an output buffer associated with the stage. One stage's output buffer is typically the next stage's input buffer. Such an arrangement allows all of the stages to work in parallel and therefore yields greater throughput than if each instruction had to pass through the entire pipeline before the next instruction could enter the pipeline. Unfortunately, it is not always apparent which instruction should be fed into the pipeline next, because many instructions have conditional branches.

When a computer processor encounters instructions that have conditional branches, branch prediction is used to eliminate the need to wait for the outcome of the conditional branch instruction and therefore keep the processor pipeline as full as possible. Thus, a branch prediction architecture predicts whether the branch will be taken and retrieves the predicted instruction rather than waiting for the current instruction to be executed. Indeed, it has been determined that branch prediction is one of the most important contributors to processor performance.

One approach to branch prediction involves a bimodal predictor, which generates a local prediction for a branch instruction, and a global predictor, which generates a global prediction for the branch instruction. The bimodal predictor predicts whether the branch will be taken based on the instruction address of the branch instruction and the state of an n-bit counter assigned to the branch instruction. The global predictor predicts whether the branch will be taken according to an index or "stew", which is based on the instruction address and information from a global branch history, where the global predictor is used because branch instructions sometimes have the tendency to correlate to other nearby instructions. The length of the global branch history determines how much correlation can be captured by the global predictor.

While the bimodal/global (BG) approach provides substantial improvement over strict bimodal prediction, there remains considerable room for improvement. For example, the extent to which global prediction is helpful in accounting for correlation depends upon the type of application being run. For example, certain applications have code in which branch instructions correlate to instructions that are in relatively close proximity, whereas other applications have code in which branch instructions correlate to instructions that are farther away. As a result, certain types of code benefit from a shorter global branch history, while other types of code benefit from a longer global branch history.

There is therefore a need for a branch prediction approach that provides for more flexible global branch prediction.

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figure 1:
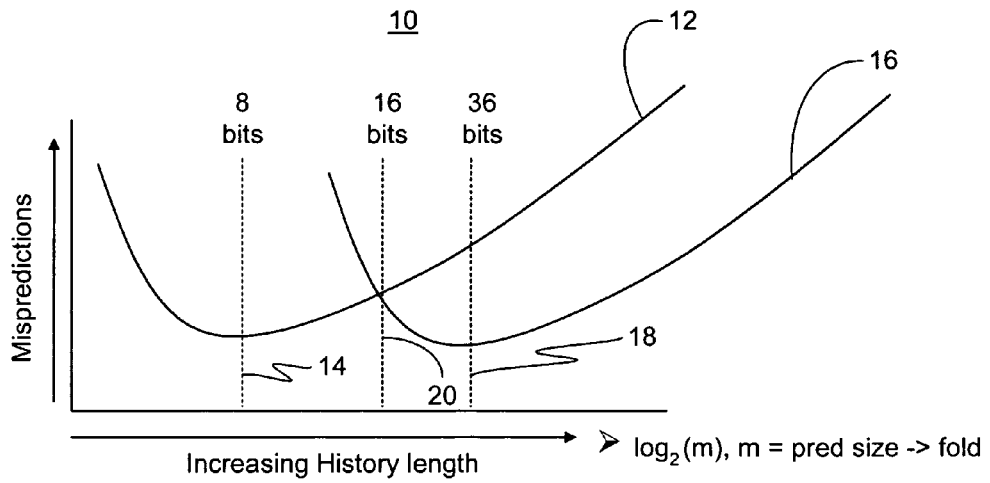
FIG. 1 is a plot of an example of an illustration of global history length versus branch mispredictions for multiple applications according to one embodiment of the invention.

Systems and methods of predicting branches provide more flexible global branch prediction, which results in substantial performance improvements. FIG. 1 shows a plot 10 of global branch history length versus misprediction for multiple program traces, where the program traces correspond to program trace curves 12, 16. The illustrated program trace curves 12, 16 may represent phases of different applications or different phases of the same application. In general, the plot 10 shows that the applications are leveraging information from the global history as bits are added to the global branch history until a minimum number of mispredictions is reached. Beyond the minimum point, branches that are not related to a given prediction begin to map to the same prediction. Such a condition is commonly referred to as aliasing. Specifically, a first program trace curve 12 represents the number of mispredictions during the execution of a first program trace for different history lengths. Curve 12 has an optimum history length 14 that is relatively short (i.e., eight bits). On the other hand, a second program trace curve 16 has an optimal history length 18 that is relatively long (i.e., thirty-six bits). Conventional branch prediction architectures, however, have only a single global predictor and therefore must select a "medium" history length 20 that is optimum to neither curve 12 nor curve 16 (i.e., sixteen bits). By utilizing multiple global predictors, embodiments of the present invention exhibit better adaptation to different types of program code and/or applications. Simply put, since different applications contain branches that correlate to other branches at varying distances, the use of multiple history lengths enables a more accurate predictor where both useful history is maximized and branch aliasing is minimized.

Figure 2:
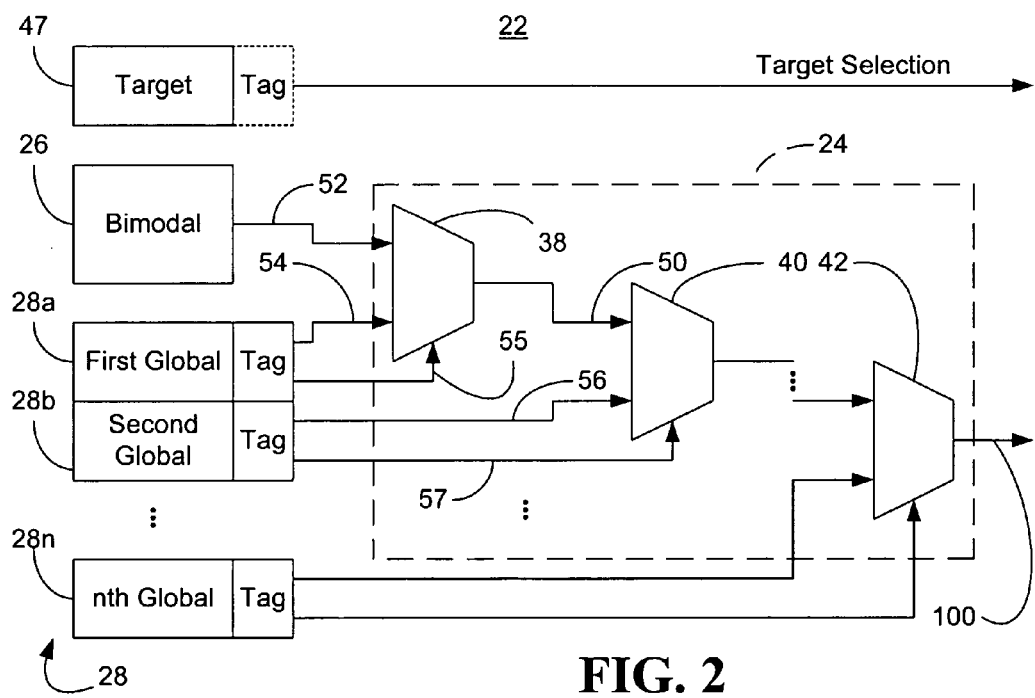
FIG. 2 is a block diagram of an example of a branch prediction architecture according to one embodiment of the invention.

Turning now to FIG. 2, a branch prediction architecture 22 is shown. Architecture 22 has a prediction selector 24 and a bimodal predictor 26 coupled to the prediction selector 24, where the illustrated selector 24 functions as a plurality of cascaded multiplexers. The bimodal predictor 26 generates a bimodal prediction 52 for a branch instruction. Architecture 22 also has a plurality of global predictors 28 (28a-28n) coupled to the prediction selector 24. Each global predictor 28 generates a corresponding global prediction 54, 56 for the branch instruction, where the prediction selector 24 selects a branch prediction 100 from the bimodal prediction 52 and the global predictions 54, 56.

Figure 3A:
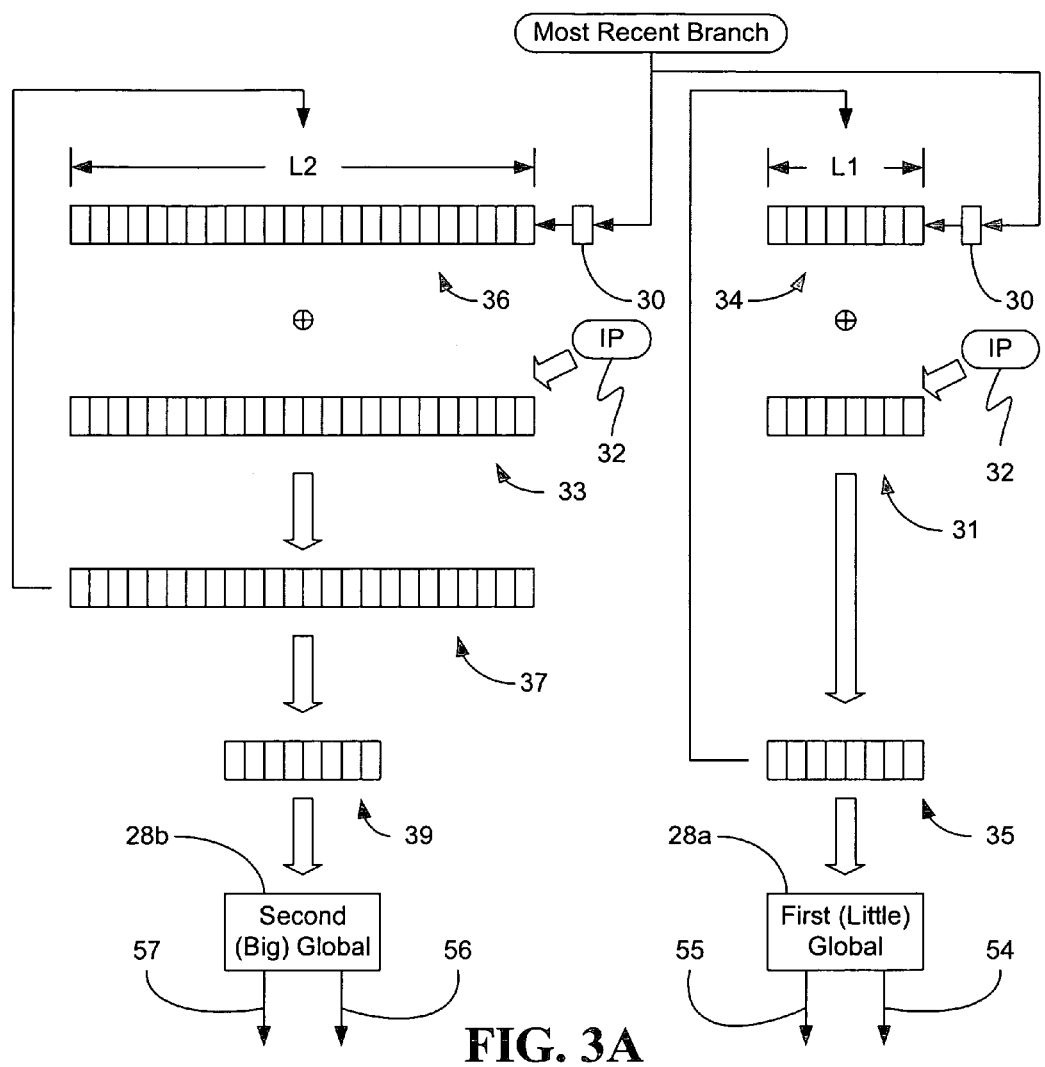
FIG. 3A is a block diagram of an example of an approach to generating global array indices according to one embodiment of the invention.

With continuing reference to FIGS. 2 and 3A, it can be seen that each global prediction 54, 56 is to be generated based on a different amount of global branch history information. In the illustrated example, a most recent branch bit 30 is shifted into a previous first stew and a previous second stew to obtain a current first stew 34 and a current second stew 36, respectively. It should be noted that separate stews are shown only for ease of discussion, and that the same stew can be the source of index 35 as well as index 37. Indeed, sharing the global branch history information helps to minimize processor area. An exclusive OR (XOR) operation is performed between the current stews 34, 36 and one or more portions 31, 33 of an instruction address (or instruction pointer/IP) 32. The result is a first index 35 and a second index 37. The first index 35 is used to index into an array of a first global predictor 28a, and the second index 37 is used to index into an array of a second global predictor 28b. In the illustrated example, the second index 37 is folded into a folded index 39 based on the size of the array of the second global predictor, where the folded index 39 is substituted for the second index 37 during the indexing operation. The size of the global arrays with regard to folding is discussed in greater detail below.

Thus, the plurality of global predictors 28 includes the first global predictor 28a having an index 35 associated with a first amount L1 of global branch history information, such as eight bits, and the second global predictor 28b having an index 39 associated with a second amount L2 of global branch history information, such as twenty-four or thirty-six bits. Thus, the smaller amount/shorter length is tailored to branch instructions that correlate to instructions that are in relatively close proximity, whereas the larger amount/longer length is tailored branch instructions that correlate to instructions that are farther away.

Figure 3B:
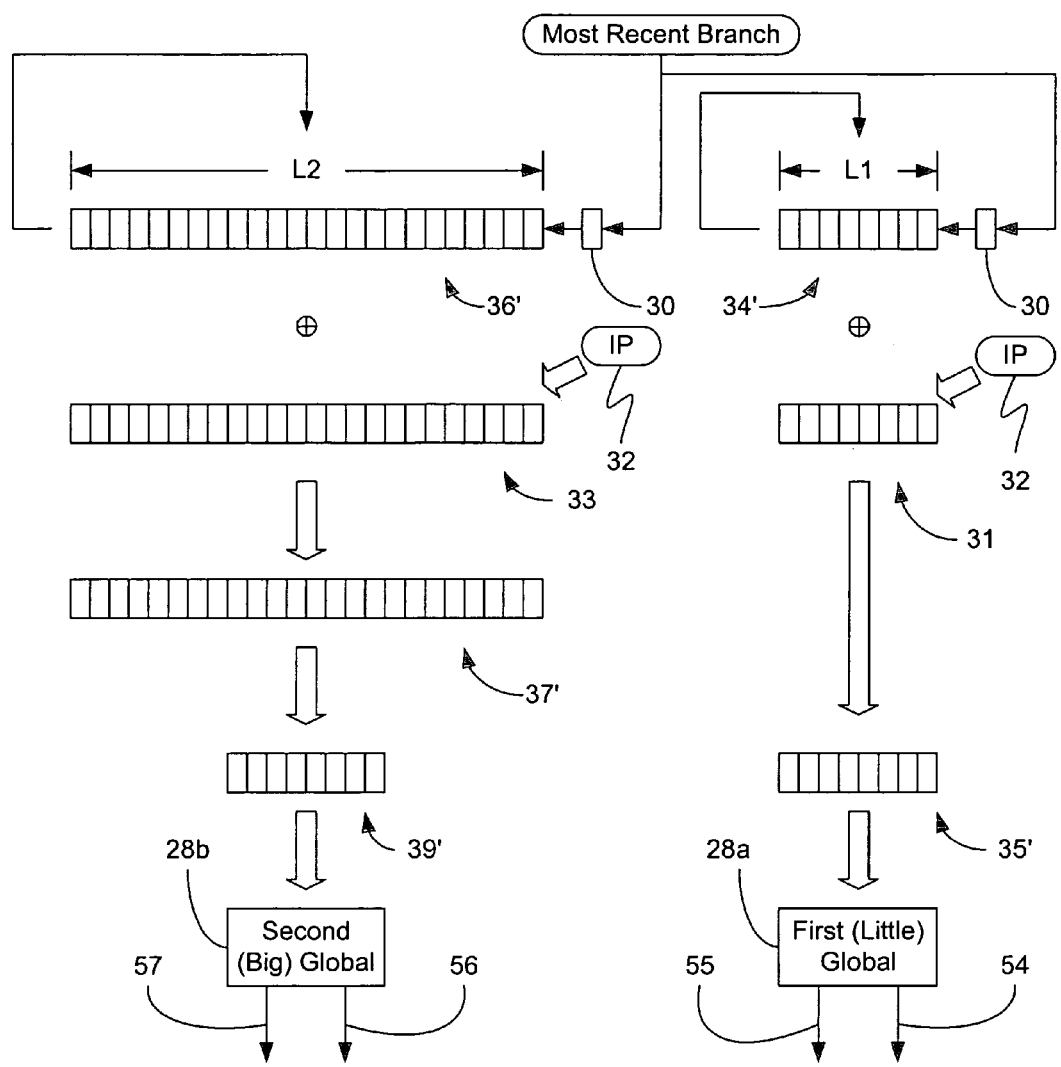
FIG. 3B is a block diagram of an example of an approach to generating global array indices according to an alternative embodiment of the invention.

With continuing reference to FIGS. 2 and 3B, an alternative approach to generating global array indices is shown. In the illustrated example, the most recent branch bit 30 is shifted into a previous first global branch history and a previous second global branch history to obtain a current first global branch history 34' and a current second global branch history 36', respectively. As noted above, a common global branch history can be used. An XOR operation is performed between the current global branch histories 34', 36' and one or more portions 31, 33 of the instruction address 32. The result is a first index 35' and a second index 37'. Thus, index 35' is associated with the first amount L1 of global branch history information and index 37' is associated with the second amount L2 of global branch history information. The first index 35' is used to index into the array of the first global predictor 28a, and the second index 37' is used to index into the array of the second global predictor 28b. In the illustrated example, the second index 37' is folded into a folded index 39' based on the size of the array of the second global predictor, where the folded index 39' is substituted for the second index 37' during the indexing operation.

Since the amount of global branch history information associated with the first global predictor 28a is less than the amount associated with second global predictor 28b, the first global array can be viewed as a "little" global, or "g", array. Likewise, the second global array can be viewed as a "big" global, or "G", array. Thus, combining the bimodal, little global and big global arrays into a common branch prediction architecture yields a "BgG" branch prediction architecture. Table I shows the relevant parameters for the global arrays in comparison to the conventional global array of a BG architecture.

TABLE I

|  | BG | little g (BgG) | big G (BgG) |
|---|---|---|---|
| Stew length | 17-bit | 8-bit | 36-bit |

As already noted, the first global predictor 28a includes a first global array, where the first global predictor 28a generates a first global prediction 54 by indexing into the first global array based on index 35'. The second global predictor 28b includes a second global array, where the second predictor 28b generates a second global prediction 56 by indexing into the second global array based on index 39'. The predictions 52, 54, 56 include a predicted direction (i.e., taken/not taken) and may include an instruction target address of the current branch instruction.

As also already noted, the second global predictor 28b can fold the index 37' if L2 is larger than $\log_2$ (number of entries) of the second global array. For example, an array with 256 entries can be indexed with $\log_2$ (256)=eight bits. In order to capture as much information as possible from the index 37', folding is implemented. Simply put, the folded index 39' allows large amounts of global branch history information to be comprehended in smaller more implementable arrays. Folding can be achieved by performing an exclusive OR (XOR) operation between the top half of the index 37' and the bottom half of the index 37'. Alternatively, the index 37' can be divided into four parts and XOR'ed accordingly, and so on. The above discussion also applies to indices 35, 37 (FIG. 3A), which are based on stews 34, 36 (FIG. 3A). It should be also noted that the amount of resolution to be achieved by the plurality of global predictors 28 can be adjusted by increasing or reducing the number of global predictors 28. Thus, the plurality of global predictors 28 can include a third global predictor having a third history length, etc.

The illustrated prediction selector 24 has a first multiplexer 38 that generates an intermediate prediction 50 based on the bimodal prediction 52, the first global prediction 54 and a signal 55 that indicates whether a hit has occurred in the first global array. A second multiplexer 40 can select the branch prediction 100 based on the intermediate prediction 50, the second global prediction 56 and a signal 57 that indicates whether a hit has occurred in the second global array. The number of multiplexers in the prediction selector 24 can be increased based on the number of global predictors and will generally be one less than the total number of predictors or equal to the total number global predictors. Thus, a third multiplexer 42 can also be included, and so on.

In accordance with a cascaded prediction policy, the second multiplexer 40 selects the second global prediction 56 if a hit notification is received from the second global array and selects the intermediate prediction 50 if a hit notification is not received from the second global array. The hit notification for the second global array is provided by signal 57. The first multiplexer 38 selects the first global prediction 54 if a hit notification is received from the first global array and selects the bimodal prediction 52 if a hit notification is not received from the first global array. The hit notification for the first global array is provided by signal 55. The cascaded prediction policy therefore leverages each predictor as a filter. The array of the bimodal predictor 26 is direct mapped in order to provide a "default" prediction. All predictions are invalid unless we receive a hit from a tagged target array 47 (FIGS. 2 and 6), which provides the address for the target of the branch instruction when the branch is predicted taken. Combining the array of the bimodal predictor 26 with the target array 47 enables tag space savings and can be seen as a design system optimization.

Figure 6:
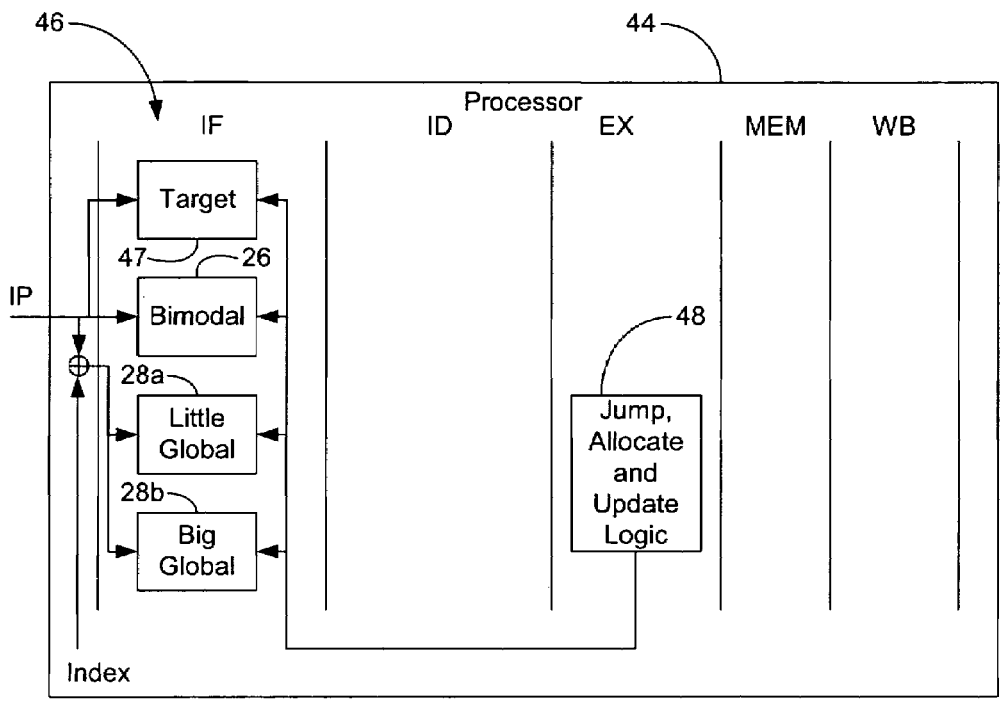
FIG. 6 is a diagram of an example of a processor pipeline according to one embodiment of the invention.

Turning now to FIG. 6, a processor 44 having an instruction fetch (IF) pipeline stage with improved branch prediction architecture 46 is shown. Other stages of a typical pipeline include instruction decode (ID), execute (EX), memory (MEM), and writeback (WB), where an execute stage jump execution unit 48 includes allocation logic and update logic. The execute stage update is sooner in the pipeline, but typically less accurate than retirement (or writeback) stage update. Retirement stage update is able to distinguish correct path from wrong path instructions which could pollute the predictors. The allocation logic provides for generating new (or allocating) entries in the prediction arrays in response to branch mispredictions, and the update logic provides for updating current predictions based on actual outcomes. It should be noted that the trend toward higher speed processors typically results in more stages between instruction fetch and execution. As a result, the advantages associated with the illustrated branch prediction architecture have a significant effect an overall processor performance.

Figure 4:
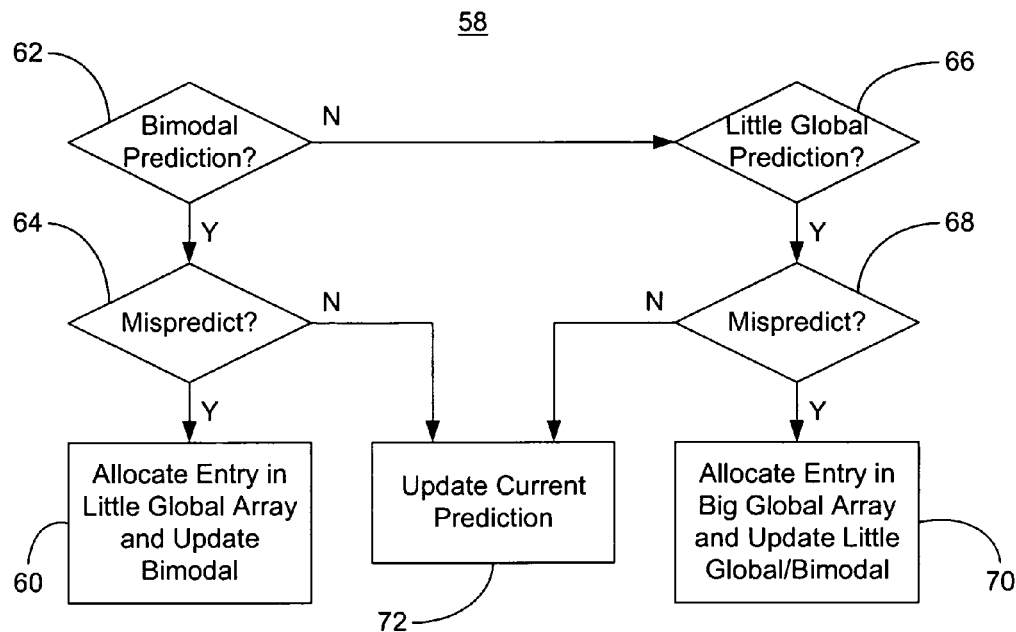
FIG. 4 is a flowchart of an example of a method of allocating prediction array entries according to one embodiment of the invention.

With continuing reference to FIGS. 4 and 6, the operation of the allocation logic will be described in greater detail. Specifically, allocation process 58 provides for allocating an entry in the first (or little) global array at processing block 60 if it is determined at block 62 that the branch prediction originated from the bimodal predictor and it is determined at block 64 that the branch prediction resulted in a misprediction. Block 60 also provides for updating the bimodal array. It should be noted that predictions are taken from the bimodal predictor only when all other arrays have missed. Accordingly, the bimodal predictor has the lowest priority. It should also be noted that block 60 assumes that there will always be a hit in the target array. If such is not the case, then a decision block can be readily inserted between blocks 64 and 60 in order to detect tag array misses. If it is determined at block 66 that the branch prediction originated from the little global predictor and it is determined at block 68 that the branch prediction resulted in a misprediction, an entry in the second (or big) global array is allocated to the branch instruction at block 70. Thus, the cascaded allocation process 58 uses each level of prediction as an aliasing filter. If the branch prediction is correct, the current prediction is updated at block 72. It should be noted that block 70 also provides for updating the bimodal and little global arrays. The little global update represents an optimization that enables the little global predictor to generate more accurate predictions while the big global predictor is "warming up." Failing to update the little global array as illustrated in block 70 may negatively impact performance.

Figure 5:
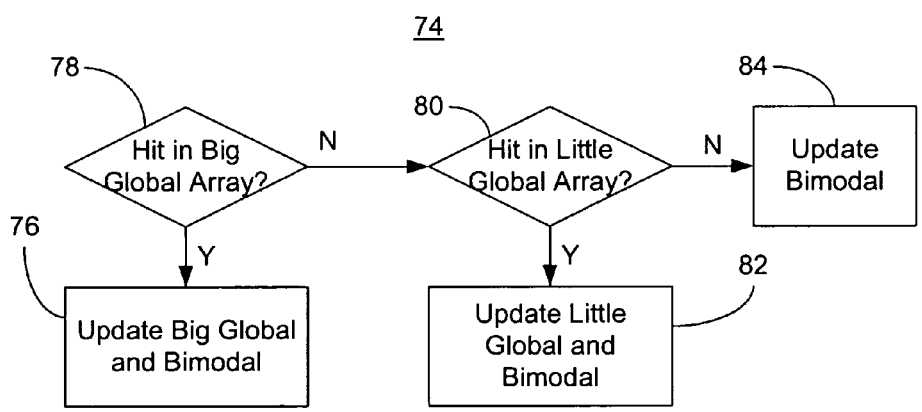
FIG. 5 is a flowchart of an example of a method of updating a branch prediction architecture according to one embodiment of the invention.

With continuing reference to FIGS. 4-6, the update logic can use update process 74 to update the current prediction. Thus, update process 74 can be readily substituted for block 72. Specifically, the bimodal array and the big global array are updated at block 76 based on the actual outcome associated with the branch prediction at block 76, if it is determined at block 78 that the tag of the branch instruction matched a tag in the big global array (i.e., a hit occurred in the big global array). If it is determined at block 80 that the tag of the branch instruction matched a tag in the little global array, the bimodal array and the little global array are updated at block 82 based on the actual branch outcome. If a hit occurred in neither of the global arrays, the bimodal array is updated at block 84. Thus, the bimodal array is always updated. Furthermore, it should be noted that the little global array is not updated when a hit has occurred in the big global array, except on allocation. Such a "partial update" can significantly improve performance as it minimizes pollution in the array of lesser precedence—the little global in this situation. The little global array is updated while allocating into the big global array in order to achieve more accurate prediction while the index associated with the big global array is fluctuating.

Figure 7:
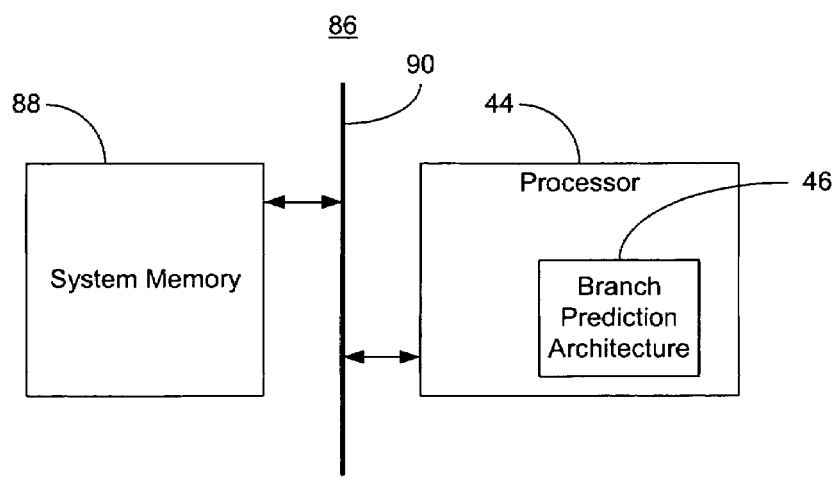
FIG. 7 is a block diagram of an example of a computer system according to one embodiment of the invention.

Turning now to FIG. 7, a computer system 86 is shown. Computer system 86 includes a system memory 88 such as random access memory (RAM), read only memory (ROM), flash memory, etc., that stores a branch instruction and a system bus 90 coupled to the system memory 88. Processor 44 includes branch prediction architecture 46, which is coupled to the system bus 90. As already discussed, the branch prediction architecture 46 can include a prediction selector, a bimodal predictor coupled to the prediction selector, and a plurality of global predictors coupled to the prediction selector. The bimodal predictor generates a bimodal prediction for the branch instruction, where each global predictor generates a corresponding global prediction for the branch instruction. The prediction selector chooses or selects a branch prediction from the bimodal prediction and the global predictions. While the illustrated system 86 retrieves the branch instruction from system memory 88, the branch instruction may also be retrieved from any appropriate "on chip" memory such as a trace cache, instruction cache, etc.

Thus, the use of a plurality of global predictors enables a number of advantages to be achieved over conventional approaches. BgG branch prediction can be more accurate because it is able to adapt to specific application behavior. A global predictor with very long history is able to predict loops and other application branches that cannot be predicted in conventional global predictors. More accurate branch predictors have a first order effect on overall application performance. Thus, microprocessors incorporating a plurality of global branch predictors can outperform those with a single global predictor.

Other mechanisms are also described to most effectively leverage the plurality of global branch predictors. For example, the use of cascaded allocation for prediction filtering increases the effective predictor capacity. Partial update eliminates aliasing in lower level branch predictors. Furthermore, optimizations are described which minimize processor area and improve processor efficiency: the sharing of global histories enables a big global array to leverage data from the small global array to minimize the impact of the feature on processor area. Folding enables predictor arrays to be maintained at a reasonable size without sacrificing the additional global branch history information. In addition, tag sharing between the bimodal and target enhance efficiency by removing duplicate information.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A branch prediction architecture comprising:
 a prediction selector;
 a bimodal predictor coupled to the prediction selector, the bimodal predictor to generate a bimodal prediction for a branch instruction;
 a plurality of global predictors coupled to the prediction selector, each global predictor to generate a corresponding global prediction for the branch instruction, the prediction selector to select a branch prediction from the bimodal prediction and the global predictions, wherein each global prediction is to be generated based on a different amount of global branch history information;
 a first global predictor to generate a first global prediction by indexing into a first global array based on a first index, the first index to be associated with a first amount of global branch history information; and
 a second global predictor to generate a second global prediction by indexing into a second global array based on a second index, the second index to be associated with a second amount of global branch history information and folding the second index to obtain a smaller index for use in indexing into the second global array, the first amount to be less than the second amount.

2. The branch prediction architecture of claim 1, wherein the branch prediction architecture is to generate the first index by shifting a most recent branch bit into a previous first stew to obtain a current first stew and performing an exclusive OR operation between the current first stew and one or more portions of an instruction address associated with the branch instruction, and to generate the second index by shifting the most recent branch bit into a previous second stew to obtain a current second stew and performing an exclusive OR operation between the current second stew and one or more portions of the instruction address, the previous and current first stews to have a length that corresponds to the first amount and the previous and current second stews to have a length that corresponds to the second amount.

3. The branch prediction architecture of claim 1, wherein the branch prediction architecture is to generate the first index by shifting a most recent branch bit into a previous first global branch history to obtain a current first global branch history and performing an exclusive OR operation between the current first global branch history and one or more portions of an instruction address associated with the branch instruction, and to generate the second index by shifting the most recent branch bit into a previous second global branch history to obtain a current second global branch history and performing an exclusive OR operation between the current second global branch history and one or more portions of the instruction address, the previous and current first global branch histories to have a length that corresponds to the first amount and the previous and current second global branch histories to have a length that corresponds to the second amount.

4. The branch prediction architecture of claim 1, wherein the plurality of global predictors includes a third global predictor to generate a third global prediction by indexing into a third global array based on a third index, the third index to be associated with a third amount of global branch history length, the second amount being less than the third amount.

5. The branch prediction architecture of claim 1, wherein the prediction selector includes:
 a first multiplexer to generate an intermediate prediction based on the bimodal prediction, a first global prediction and whether a hit has occurred in a first global array; and
 a second multiplexer to select the branch prediction based on the intermediate prediction, a second global prediction and whether a hit has occurred in a second global array.

6. The branch prediction architecture of claim 5, wherein the second multiplexer is to select the second global prediction if a hit notification is received from the second global array and select the intermediate prediction if a hit notification is not received from the second global array.

7. The branch prediction architecture of claim 6, wherein the first multiplexer is to select the first global prediction if a hit notification is received from the first global array and select the bimodal prediction if a hit notification is not received from the first global array.

8. The branch prediction architecture of claim 5, further including allocation logic coupled to the prediction selector, the allocation logic to allocate an entry in the first global array to the branch instruction if the branch prediction results in a misprediction and originates from the bimodal predictor.

9. The branch prediction architecture of claim 8, wherein the allocation logic is to allocate an entry in the second global array to the branch instruction if the branch prediction results in a misprediction originated from a first global predictor, where the first global predictor generates the first global prediction.

10. The branch prediction architecture of claim 5, further including update logic coupled to the predictors, the update logic to update a bimodal array of the bimodal predictor based on an actual branch outcome associated with the branch prediction.

11. The branch prediction architecture of claim 10, wherein the update logic is to update the second global array based on the actual branch outcome if the tag of the branch instruction matched a tag in the second global array.

12. The branch prediction architecture of claim 10, wherein the update logic is to update the first global array based on the actual branch outcome if the tag of the branch instruction matched a tag in the first global array.

13. The branch prediction architecture of claim 10, wherein the update logic is to update the first global array based on the actual branch outcome if the tag of the branch instruction did not match a tag in the second global array and if the tag of the branch instruction matched a tag in the first global array.

14. The branch prediction architecture of claim 1, wherein the branch prediction is to include a predicted direction of the branch instruction.

15. The branch prediction architecture of claim 14, wherein the branch prediction is to further include an instruction target address of the branch instruction.

16. A branch prediction architecture comprising:
 a prediction selector having a first multiplexer and a second multiplexer;

a bimodal predictor coupled to the prediction selector, the bimodal predictor to generate a bimodal prediction for a branch instruction;

a plurality of global predictors coupled to the prediction selector, each global predictor to generate a corresponding global prediction for the branch prediction, the first multiplexer to generate an intermediate prediction based on the bimodal prediction, a first global prediction and whether a hit has occurred in a first global array, the second multiplexer to select a branch prediction based on the intermediate prediction, a second global prediction and whether a hit has occurred in a second global array;

allocation logic coupled to the prediction selector, the allocation logic to allocate an entry in the first global array to the branch instruction if the branch prediction results in a misprediction and originated from the bimodal predictor, the allocation logic to allocate an entry in the second global array to the branch instruction if the branch prediction results in a misprediction and originated from the first global prediction;

update logic coupled to the predictors, the update logic to update a bimodal array of the bimodal predictor based on an actual branch outcome associated with the branch prediction, each global prediction to be generated based on a different amount of global branch history information;

a first global predictor to generate a first global prediction by indexing into a first global array based on a first index, the first index to be associated with a first amount of global branch history information; and a second global predictor to generate a second global prediction by indexing into a second global array based on a second index the second index to be associated with a second amount of global branch history information and folding the second index to obtain a smaller index for use in indexing into the second global array, the first amount to be less than the second amount, the first history amount to be less than the second amount.

17. The architecture of claim 16, wherein the branch prediction architecture is to generate the first index by shifting a most recent branch bit into a previous first stew to obtain a current first stew and performing an exclusive OR operation between the current first stew and one or more portions of an instruction address associated with the branch instruction, and to generate the second index by shifting the most recent branch bit into a previous second stew to obtain a current second stew and performing an exclusive OR operation between the current second stew and one or more portions of the instruction address, the previous and current first stews to have a length that corresponds to the first amount and the previous and current second stews to have a length that corresponds to the second amount.

18. The architecture of claim 16, wherein the branch prediction architecture is to generate the first index by shifting a most recent branch bit into a previous first global branch history to obtain a current first global branch history and performing an exclusive OR operation between the current first global branch history and one or more portions of an instruction address associated with the branch instruction, and to generate the second index by shifting the most recent branch bit into a previous second global branch history to obtain a current second global branch history and performing an exclusive OR operation between the current second global branch history and one or more portions of the instruction address, the previous and current first global branch histories to have a length that corresponds to the first amount and the previous and current second global branch histories to have a length that corresponds to the second amount.

19. The architecture of claim 16, wherein the branch prediction is to include a predicted direction of the branch instruction.

20. The architecture of claim 19, wherein the branch prediction is to further include an instruction target address of the branch instruction.

21. A method of processing a branch instruction comprising:

generating a bimodal prediction for the branch instruction;

generating a plurality of global predictions for the branch instruction;

selecting a branch prediction from the bimodal prediction and the global predictions, wherein each global prediction is generated based on a different amount of global branch history information generating a first global prediction by indexing into a first global array based on a first index, the first index being associated with a first amount of global branch history; and generating a second global prediction by indexing into a second global array based on a second index, the second index being associated with a second amount of global history and folding the second index to obtain a smaller index for use in indexing into the second global array, the second history amount being less than the first amount.

22. The method of claim 21, further including:

generating the first index by shifting a most recent branch bit into a previous first stew to obtain a current first stew and performing an exclusive OR operation between the current first stew and one or more portions of an instruction address associated with the branch instruction; and generating the second index by shifting the most recent branch bit into a previous second stew to obtain a current second stew and performing an exclusive OR operation between the current second stew and one or more portions of the instruction address, the previous and current first stews to have a length that corresponds to the first amount and the previous and current second stews to have a length that corresponds to the second amount.

23. The method of claim 21, further including:

generating the first index by shifting a most recent branch bit into a previous first global branch history to obtain a current first global branch history and performing an exclusive OR operation between the current first global branch history and one or more portions of an instruction address associated with the branch instruction; and generating the second index by shifting the most recent branch bit into a previous second global branch history to obtain a current second global branch history and performing an exclusive OR operation between the current second global branch history and one or more portions of the instruction address, the previous and current first global branch histories to have a length that corresponds to the first amount and the previous and current second global branch histories to have a length that corresponds to the second amount.

24. The method of claim 21, further including generating an intermediate prediction based on the bimodal prediction, a first global prediction and whether a hit has occurred in a first global array, the branch prediction being selected based on the intermediate prediction, a second global prediction and whether a hit has occurred in a second global array.

25. The branch prediction architecture of claim 1, wherein each global prediction is generated at an instruction fetch stage of a pipeline.

* * * * *